Figure 1:
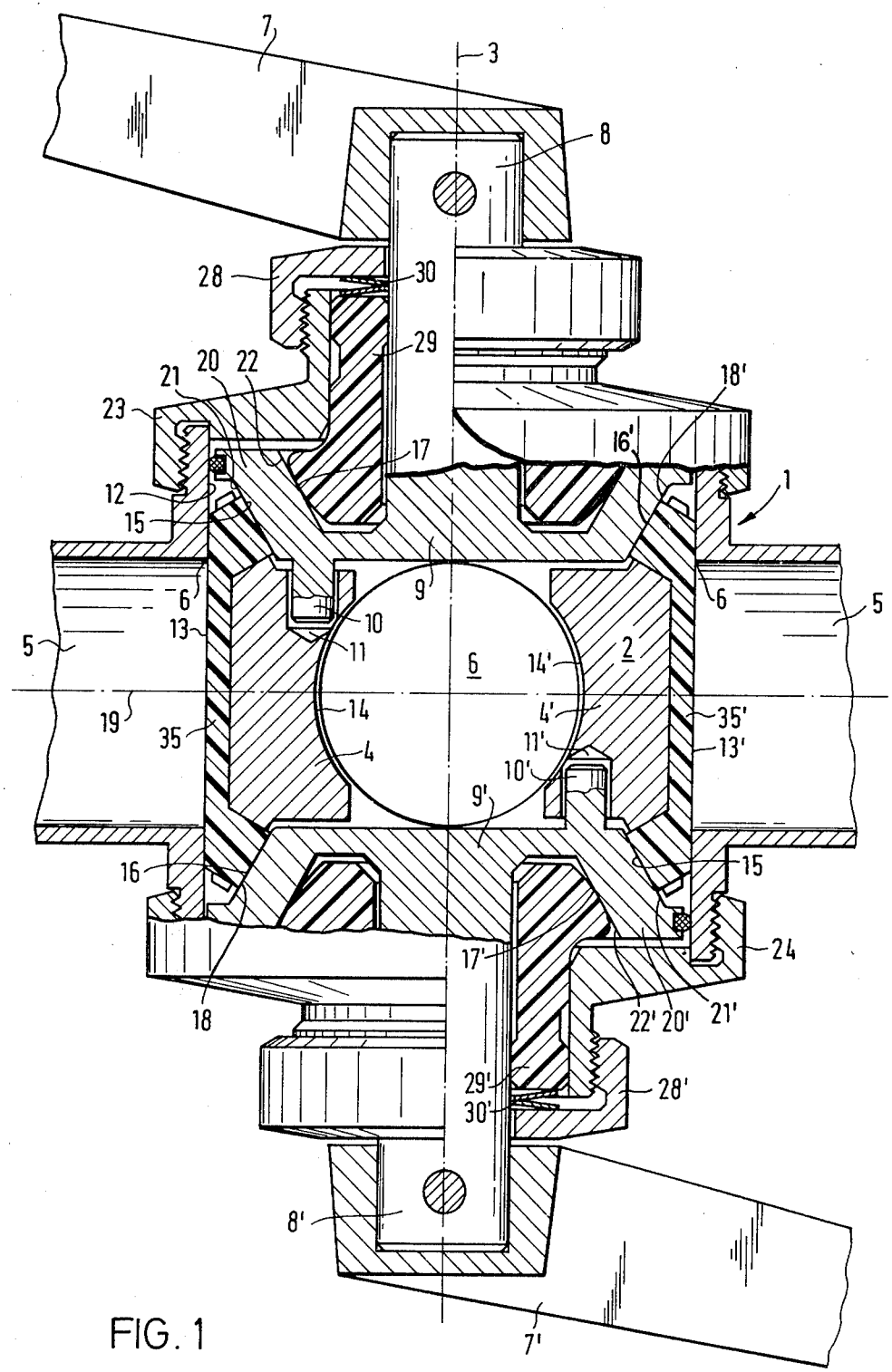
Figure 2A:
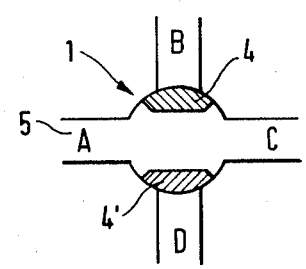
Figure 2B:
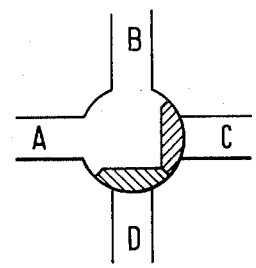
Figure 2C:
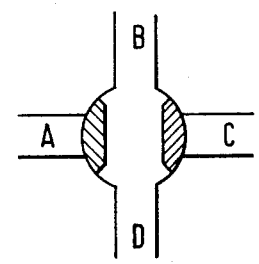
Figure 2D:
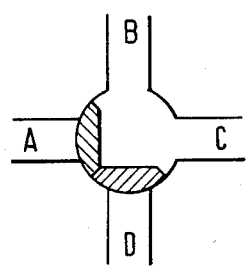
Figure 2E:
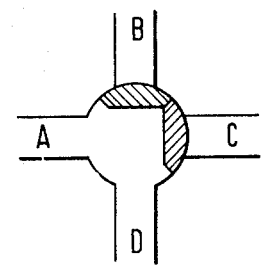
Figure 2F:
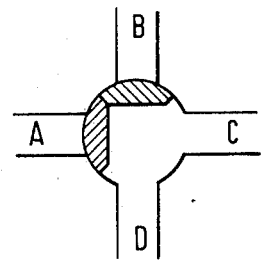

United States Patent [19]

Wulf

[11] 4,222,413

[45] Sep. 16, 1980

[54] SHUT-OFF VALVE

[75] Inventor: Gunter Wulf, Wangen im Allgau, Fed. Rep. of Germany

[73] Assignee: Hermann Waldner GmbH & Co., Wangen im Allgau, Fed. Rep. of Germany

[21] Appl. No.: 876,942

[22] Filed: Feb. 10, 1978

[30] Foreign Application Priority Data

Feb. 10, 1977 [DE] Fed. Rep. of Germany ....... 2705625

[51] Int. Cl.² ............................................. F16K 11/22
[52] U.S. Cl. ............................. 137/637.3; 137/625.46; 251/188
[58] Field of Search .................. 137/637, 637.2, 637.3, 137/637.5, 597, 625.46; 251/161, 162, 163, 182, 188, 192, 289

[56] References Cited

U.S. PATENT DOCUMENTS

| | | | |
|---|---|---|---|
| 626,596 | 6/1899 | Crane | 137/625.47 X |
| 720,012 | 2/1903 | Erdman | 251/192 |
| 2,084,248 | 6/1937 | Ferrari et al. | 137/637.3 |
| 2,103,536 | 12/1937 | Inge | 251/161 |
| 2,176,730 | 10/1939 | Church et al. | 251/182 X |
| 2,329,981 | 9/1943 | Church et al. | 251/182 X |

FOREIGN PATENT DOCUMENTS 737225  9/1955  United Kingdom ..................... 251/192

Primary Examiner—Irwin C. Cohen
Assistant Examiner—Richard Gerard
Attorney, Agent, or Firm—Stevens, Davis, Miller & Mosher

[57] ABSTRACT

A valve adapted for installation in a pipe system which carries liquid or paste foodstuffs has a housing enclosing a cylindrical bore. At least one opening in the side of the housing provides a radial pipe connection. Two closure members of segmented cross-section are rotatably disposed in the bore for rotation into open and closed positions with respect to openings in the side of the housing. Cover plates close the opposite ends of the bore and a spindle extends through each plate into the bore. One spindle is connected to one closure member and the other spindle is connected to the other closure member so that the closure members can be rotated independently of each other. The closure member is provided above and below the openings for pipe connections in the side of the housing with conical wedge surfaces each coaxial with the longitudinal axis of the bore and diverging away from the opening. The housing is provided with wedge surfaces for cooperating with those on the closure members.

4 Claims, 7 Drawing Figures

SHUT-OFF VALVE

This invention relates to a shut-off valve adapted especially for pipework systems carrying foodstuffs of the type described in my earlier application Ser. No. 764,231 filed on Jan. 31, 1977 and since abandoned. More particularly, this invention relates to an improvement of such a valve having a housing enclosing a cylindrical bore into which the pipe connections open radially and with closure members of segmental shape in cross-section and rotatable within the bore to open and close the openings of the pipe connections and urged radially outwards against the wall of the bore by means of wedge surfaces, each closure member being provided above and below the openings of the pipe connections with respective conical wedge surfaces coaxial with the longitudinal axis of the bore and diverging away from the opening which surfaces cooperate with complementary conical wedge surfaces on the housing, the two wedge surfaces on the housing being urged towards one another.

In the shut-off valve described in my earlier application, for example, two rigidly interconnected closure members can be provided, diametrically opposite one another or spaced apart 90° around the periphery of the housing. Four pipe connections are spaced apart from one another by 90° in and around the wall of the housing, so that with closure members spaced apart by 90° the four closure members can be disposed into four different positions, resulting in four different flow paths.

It is an object of this invention to improve the shut-off valve described in my aforesaid application so that the number of possible flow paths is increased.

This is achieved in accordance with this invention by providing at least four radial pipe connections in the wall of the housing of the valve which open into the bore enclosed by the housing and two closure members rotatably disposed in the bore which are spaced vertically from each other. The improved valve is also provided with a spindle disposed through each cover and connected with one of the closure members.

A handle is connected externally of the housing to each spindle for rotating this spindle and the closure member attached thereto independently of the other closure member.

In the shut-off valve of my aforesaid application having an upper and a lower cover on the housing this further embodiment turns out to be particularly advantageous because it can be converted to use of two mutually independently actuated closure members in a simple manner by replacing the lower cover with a cover which has a bore for receiving the second lower closure member with the associated shaft.

The improved valve of this invention is illustrated in the accompanying drawing wherein FIG. 1 is a partial longitudinally sectioned side view of an embodiment of the improved shut-off valve; and FIGS. 2a to f are diagrammatic illustrations of possible flow paths in the valve illustrated in FIG. 1.

Referring now to the drawing, the shut-off valve which is particularly suitable for pipework systems carrying foodstuffs comprises a housing 1 with a cylindrical bore 2 and two circumferentially spaced closure members 4,4' which are rotatable in the bore 2 about its longitudinal axis 3. Mounted on the housing 1 are four radial pipe connections 5 spaced apart at 90°, each having an opening 6 by which it opens into the cylindrical bore 2 of the housing 1. These openings, of which only three are visible in FIG. 1, as the third opening 6 lies diametrically opposite the central opening 6 in FIG. 1, are each capable of being closed off by the closure member 4 or 4', as illustrated in respect of the left and right hand openings 6 in FIG. 1.

The two closure members 4,4' are capable of independent actuation. To actuate the closure members 4,4' handle 7 or 7' is provided which is secured on the associated end projecting from the housing 1 of an actuating spindle 8 or 8'. Each actuating spindle 8,8' is provided on a shell-like follower 9 or 9' which is arranged at that end of the bore 2 of the housing 1 which is towards the handle 7 or 7', and has on the end which is furthest from the actuating spindle 8 or 8' a peg 10 or 10' which engages in a recess 11 or 11' in the associated closure member 4 or 4'. On operation of the respective handle 7 or 7' the follower 9 or 9' turns with it about the longitudinal axis 3 of the bore 2 so that the closure member 4 or 4' is displaced by means of the peg 10 or 10' along the cylindrical wall 12 of the bore 2. Instead of the handle 7 or 7' one could also provide another actuating member, for example, a hydraulically or pneumatically actuated ram, where the shut-off valve is to be operated automatically and/or from a remote point.

Each closure member 4,4' has a cross-section, perpendicular to the longitudinal axis 3 of the bore 2 which is segmental. While the external surface 13 or 13' of each closure member 4,4' has a substantially cylindrical shape coaxial with the longitudinal axis 3 of the bore 2, each closure member 4,4' is provided on its rear face with a recess 14,14' which has a cylindrical surface of which the radius of curvature corresponds approximately to the radius of the openings 6 and which is turned through 90' with respect to the cylindrical external surface 13 so that when two openings 6 are closed off by the closure members 4,4' the other two openings 6 are completely free, that is to say, over their entire cross section.

Each closure member 4,4' is provided on its rear face above and below the openings 6 of the pipe connections 5 with conical wedge surfaces 15 and 16 or 15' and 16' respectively, coaxial with the longitudinal axis 3 of the bore 2 and diverging away from the opening 6. The two wedge surfaces 15,16 and 15',16' of each closure member 4,4' cooperate with respective complementary conical wedge surfaces 17 or 18 and 17' or 18' on the housing 1. The two wedge surfaces 15 and 16 and 15' and 16' of each closure member 4,4' are symmetrical with respect to one another, that is to say, to the central plane 19 of the two closure members 4,4' that is perpendicular to the longitudinal axis 3 of the bore 2.

In the embodiment shown in FIG. 1 the upper wedge surface 15 on the closure member 4 and lower wedge surface 15' on the closure member 4' do not engage directly against the corresponding wedge surface 17 or 17' of the housing 1 but, on the contrary, between these wedge surfaces 15 and 17 or 15' and 17' there is interposed the inclined rim 20 or 20' of the shell-shaped follower 9 or 9' which has a corresponding conical external surface 21 or 21' and inner surface 22 or 22'.

The housing 1 is provided with an upper cover 23 and a lower cover 24 which are both screwed securely to the housing 1. Each cover 23,24 has a screwed cap 28 or 28' on the opposite end from the housing 1. The upper wedge surface 17 and the lower wedge surface 17' of the housing 1 are provided on a support member 29 or 29', respectively, which is movable in the direction of the longitudinal axis 3 of the bore 2 of the housing 1 and is convexly curved in cross-section.

Each support member 29,29' is formed as a bearing bush for the actuating spindle 8 or 8' and is arranged to be axially movable in the cover 23 or 24 of the housing 1. Between each screwed cap 28,28' and the adjacent end of the support member 29 or 29' is a compression spring 30 or 30' in the form of a plate spring. It's preloading is adjustable by screwing the cap 28 or 28' on the cover 23 or 24, thereby also adjusting the force with which the closure member 4 is pressed against the wall 12 of the bore 2 of the housing 1.

Preferably each closure member 4,4' is made, at least on the face which is towards the wall 12 of the bore 2 of the housing 1 of plastic material, in particular, polytetrafluoroethylene or a tetrafluoroethylene/hexafluoropropylene copolymer. For this purpose on the stated face of each closure member 4,4' there can be provided an insert or coating 35 or 35' of the appropriate plastic. Polytetrafluoroethylene or a tetrafluoroethylene/hexafluoropropylene copolymer give the closure member 4 outstanding sliding characteristics in contact with a housing 1 of steel, and in addition a certain advantageous degree of resilience. Moreover, they give the necessary ability to withstand flowing foodstuffs, for example, milk or the like, likewise to withstand the usual flushing or cleaning fluids.

As can be seen in particular in FIG. 2a to f the two mutually independently actuated closure members 4,4' in the cutoff valve described above with four radial pipe connections can be turned in such a way that, as desired, the flow paths can be set as follows, A-C, A-B, B-D, B-C, A-D, C-D, that is to say, six different paths altogether.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A shut-off valve comprising:
   a housing having a cylindrical bore therein;
   four circumferentially spaced pipe connections radially opening into the housing in a direction substantially perpendicular to said bore;
   a first closure member in direct sealing contact with the cylindrical bore of the housing to sealingly close off any selected one of said pipe connections;
   a second closure member, having a construction identical to that of said first closure member, in direct sealing contact with the bore to close off any selected one of said pipe connections;
   a first upper cover on the upper end of the housing;
   a second lower cover on the lower end of the housing;
   a first actuating member extending through the first cover and connected to the first closure member for controlling movement thereof within the bore; and
   a second actuating member, having a construction identical to that of said first actuating member, extending through the second cover and connected to the second closure member for controlling movement thereof within the bore.

2. A shut-off valve comprising:
   a housing having a substantially vertically extending bore therein;
   four circumferentially spaced substantially horizontally extending pipe connections radially opening into the housing;
   a first closure member in direct sealing contact with cylindrical bore of the housing, said first member being rotatable about the axis of the bore to selectively sealingly close any one of said pipe connections;
   a second closure member, having a construction identical to that of said first closure member, in direct sealing contact with the cylindrical bore of the housing, said second member being rotatable about the axis of the bore to selectively sealingly close any one of said pipe connections;
   a first upper cover on the upper end of the housing;
   a second lower cover on the lower end of the housing;
   a first rotatable actuating member substantially coaxial with the bore extending from above the first cover downwardly through it into the bore, and connected to the first closure member to rotate it;
   a first rotatable control member above the first cover and connected to the first actuating member so that when the first control member is rotated, it rotates the first actuating member and first closure member to selectively close any selected one of the pipe connections;
   a second rotatable actuating member, having a construction identical to that of said first rotatable actuating member, substantially coaxial with the bore, extending from below the second cover upwardly through it into the bore and fixedly connected to the second closure member to rotate it; and
   a second rotatable control member below the second cover and connected to the second actuating member so that when the second control member is rotated, it rotates the second actuating member and the second closure member to selectively close any selected one of the pipe connections.

3. A shut-off valve as in claims 1 or 2, wherein each of said first and second closure members defines opposite upper and lower wedge surfaces respectively in facing abutment with complementary wedge surfaces on said first and second actuating members and wherein said shut-off valve further comprises a first biasing means for biasing the wedge surface of said first actuating member into pushing contact with the upper wedge surface of said first and second closure members, and a second biasing means for biasing the wedge surface of said second actuating member into pushing contact with the lower wedge surface of said first and second closure members, the pushing contact of the wedge surfaces of said actuating members against the first and second wedge surfaces of said closing members causing a pushing of said first and second closure members into sealing engagement with the bore of said housing.

4. A shut-off valve as in claim 3, wherein the amount of biasing provided by said first and second biasing means is adjustable to thereby vary the degree of sealing engagement between said first and second closure members and said bore.

* * * * *